United States Patent
Vilermo et al.

(10) Patent No.: US 11,792,512 B2
(45) Date of Patent: Oct. 17, 2023

(54) PANORAMAS

(71) Applicant: Nokia Technologies Oy, Espoo (FI)

(72) Inventors: Miikka Tapani Vilermo, Siuro (FI); Arto Juhani Lehtiniemi, Lempäälä (FI); Lasse Juhani Laaksonen, Tampere (FI); Tapani Pihlajakuja, Kellokoski (FI)

(73) Assignee: Nokia Technologies Oy, Espoo (FI)

( * ) Notice: Subject to any disclaimer, the term of this patent is extended or adjusted under 35 U.S.C. 154(b) by 155 days.

(21) Appl. No.: 17/286,281

(22) PCT Filed: Oct. 31, 2019

(86) PCT No.: PCT/EP2019/079849
§ 371 (c)(1),
(2) Date: Apr. 16, 2021

(87) PCT Pub. No.: WO2020/094499
PCT Pub. Date: May 14, 2020

(65) Prior Publication Data
US 2021/0344831 A1   Nov. 4, 2021

(30) Foreign Application Priority Data
Nov. 7, 2018  (EP) .................... 18205015

(51) Int. Cl.
*H04N 23/67* (2023.01)
*H04S 7/00* (2006.01)
(Continued)

(52) U.S. Cl.
CPC ......... *H04N 23/67* (2023.01); *H04N 23/6812* (2023.01); *H04N 23/698* (2023.01);
(Continued)

(58) Field of Classification Search
CPC ........... H04N 5/23212; H04N 5/23238; H04N 5/23258; H04N 5/23216; H04N 5/04;
(Continued)

(56) References Cited

U.S. PATENT DOCUMENTS

2006/0028542 A1  2/2006  Rondinelli et al.
2010/0239223 A1  9/2010  Oisel et al.
(Continued)

FOREIGN PATENT DOCUMENTS

CN  101690154 A   3/2010
CN  102804808 A   11/2012
(Continued)

OTHER PUBLICATIONS

Office action received for corresponding Chinese Patent Application No. 201980072809.6, dated May 7, 2022, 8 pages of office action and 2 pages of translation available.
(Continued)

*Primary Examiner* — Lin Ye
*Assistant Examiner* — Tuan H Le
(74) *Attorney, Agent, or Firm* — Harrington & Smith

(57) ABSTRACT

An apparatus, method and computer program is described comprising: capturing a plurality of visual images from an image capturing start time to an image capturing end time, for use in generating a panorama image; and capturing audio data relating to said visual images from an audio capturing start time to an audio capturing end time.

20 Claims, 11 Drawing Sheets

(51) Int. Cl.
*H04N 23/698* (2023.01)
*H04N 23/68* (2023.01)

(52) U.S. Cl.
CPC ............. *H04S 7/30* (2013.01); *H04S 2400/11* (2013.01); *H04S 2400/15* (2013.01)

(58) Field of Classification Search
CPC ........... H04N 5/232933; H04N 7/0127; H04N 5/2621; H04S 7/30; H04S 2400/11; H04S 2400/15; G06T 7/33; G06T 2207/10016
See application file for complete search history.

(56) References Cited

U.S. PATENT DOCUMENTS

| | | | |
|---|---|---|---|
| 2012/0128174 A1 | 5/2012 | Tammi et al. | |
| 2012/0162362 A1 | 6/2012 | Garden et al. | |
| 2012/0218377 A1* | 8/2012 | Oku | H04N 5/23238 348/E5.051 |
| 2013/0044884 A1 | 2/2013 | Tammi et al. | |
| 2013/0321568 A1* | 12/2013 | Suzuki | H04N 5/23238 348/36 |
| 2015/0312478 A1* | 10/2015 | Barcovschi | H04N 5/232945 348/36 |
| 2016/0286119 A1 | 9/2016 | Rondinelli | |
| 2017/0230576 A1* | 8/2017 | Sparks | H04N 5/23238 |
| 2017/0237901 A1* | 8/2017 | Lee | H04N 5/23238 348/36 |
| 2017/0372748 A1 | 12/2017 | Mccauley et al. | |

FOREIGN PATENT DOCUMENTS

| | | |
|---|---|---|
| CN | 104349052 A | 2/2015 |
| EP | 2849429 A1 | 3/2015 |
| FR | 2918240 A1 | 1/2009 |
| JP | 2009-510837 A | 3/2009 |
| JP | 2010-532610 A | 10/2010 |
| JP | 2012-178807 A | 9/2012 |
| JP | 2015-139162 A | 7/2015 |
| WO | 2007/038198 A2 | 4/2007 |
| WO | 2008/087721 A1 | 7/2008 |
| WO | 2014/162171 A1 | 10/2014 |

OTHER PUBLICATIONS

"Hoa Technical Notes—B-Format Rotation", Blue Ripple Sound, Retrieved on Apr. 16, 2021, Webpage available at : http://www.blueripplesound.com/rotations.

Extended European Search Report received for corresponding European Patent Application No. 18205015.3, dated Mar. 29, 2019, 9 pages.

Clemens et al., "Audio-Enhanced Panoramic Image Capturing and Rendering on Mobile Devices", IEEE International Conference on Multimedia and Expo, Jul. 2005, 4 pages.

International Search Report and Written Opinion received for corresponding Patent Cooperation Treaty Application No. PCT/EP2019/079849, dated Dec. 13, 2019, 13 pages.

Office action received for corresponding European Patent Application No. 18205015.3, dated Mar. 29, 2021, 5 pages.

Office action received for corresponding European Patent Application No. 18205015.3, dated Dec. 3, 2021, 4 pages.

Office action received for corresponding Chinese Patent Application No. 201980072809.6, dated Oct. 9, 2022, 4 pages of office action and no page of translation available.

Office action received for corresponding Japanese Patent Application No. 2021-524014, dated Sep. 2, 2022, 4 pages of office action and 3 pages of translation available.

* cited by examiner

PANORAMAS

RELATED APPLICATION

This application claims priority to PCT Application No. PCT/EP2019/079849, filed on Oct. 31, 2019, which claims priority to European Application No. 18205015.3, filed on Nov. 7, 2018, each of which is incorporated herein by reference in its entirety.

FIELD

This specification relates to panorama images generated from a plurality of visual images, such panorama images incorporating audio data.

BACKGROUND

Panorama images can be generated including multiple images captured using an imaging device (such as a mobile phone camera or some other camera). Audio data can be captured by microphones of the imaging device and presented as part of the panorama. There remains a need for alternative solutions relating to the presentation of such panoramas.

SUMMARY

In a first aspect, this specification describes an apparatus (e.g. an image capturing apparatus) comprising: means (such as a mobile phone or similar device) for capturing a plurality of visual images from an image capturing start time to an image capturing end time, for use in generating a panorama image; and means for capturing audio data (e.g. mono audio or stereo audio) relating to said visual images from an audio capturing start time to an audio capturing end time. The audio capturing start time may be the same as, or different to, the image capturing start time. Similarly, the audio capturing end time may be the same as, or different to, the image capturing end time.

Some embodiments may comprise means for defining one or more focus elements within the captured audio data. Captured audio within the focus elements may be amplified. Said focus elements may comprise one or more time periods and/or one or more zones. The one or more focus elements may be user defined (e.g. using a user input, such as a button press on a user interface). Some embodiments may further comprise means for determining said one or more focus element (e.g. without user input, for example by identifying one or more audio sources in some way, such as identifying important audio sources according to some metric). The determination of such focus element(s) may be carried out automatically.

Some embodiments may comprise means for defining the audio capturing start time and the audio capturing end time. The said means may include a user input. Alternatively, or in addition, the said means may be automated. The audio capturing start and/or end times may be system defined. Alternatively, or in addition, the audio capturing start and/or end times may be user defined. Some embodiments may further comprise means for determining a smooth trajectory period for said apparatus, wherein the audio capturing start time is defined by (or relative to) a start of said smooth trajectory period and/or the audio capturing end time is defined by (or relative to) an end of said smooth trajectory period. The said smooth trajectory period may be a period during which the relevant apparatus is moving on a smooth path that does not differ from a curvilinear path by more than a threshold amount or is stationary.

The image capturing start time and the image capturing end time may be user defined (e.g. using a user input, such as a button press on a user interface). Alternatively, or in addition, the audio capturing start time and the audio capturing end time may be user defined (e.g. using a user input, such as a button press on a user interface).

Some embodiments may comprise means for defining a field-of-view of audio data for presentation with the panorama image. The field-of-view of the audio data may be scaled by the relative size of a first arc between the image capturing start time and the image capturing end time and a second arc between the audio capturing start time and the audio capturing end time.

Some embodiments may further comprise: means for defining a reference direction of the panorama image; and means for modifying audio in a direction generally opposite to said reference direction, wherein audio in the direction generally opposite to said reference direction is modified such that, when presented with the panorama image, said modified audio appears to originate from one direction. The reference direction may be a centre-point of the panorama image and/or the mid-point between the imaging capturing start and end points.

In a second aspect, this specification describes an apparatus (e.g. an output generating apparatus) comprising: means for receiving a plurality of visual images from an image capturing start time to an image capturing end time, for use in generating a panorama image; means for receiving audio data relating to said visual images from an audio capturing start time to an audio capturing end time; and means for presenting the generated panorama image with the received audio. Some embodiments may include means for generating the panorama image (e.g. from some or all of the plurality of received visual images).

Some embodiments may further comprise means for receiving data relating to one of more focus elements (e.g. time period or areas) within the audio data, wherein the received audio is modified depending on the focus elements. The said focus elements may be defined during an image and/or audio capturing process (e.g. by pressing a button on a user interface).

The received audio may be modified by amplifying received audio within the focus elements. Other audio may be unamplified or handled in some other way (such as attenuated, removed entirely or presented as non-directional background audio).

The image capturing start time and the image capturing end time may be user defined (e.g. using a user input, such as a button press on a user interface). Alternatively, or in addition, the audio capturing start time and the audio capturing end time may be user defined (e.g. using a user input, such as a button press on a user interface).

Some embodiments may comprise means for defining a field-of-view of audio data for presentation with the panorama image. The field-of-view of the audio data may be scaled by the relative size of a first arc between the image capturing start time and the image capturing end time and a second arc between the audio capturing start time and the audio capturing end time.

Some embodiments may further comprise: means for defining a reference direction of the panorama image; and means for modifying audio in a direction generally opposite to said reference direction, wherein audio in the direction generally opposite to said reference direction is modified such that, when presented with the panorama image, said modified audio appears to originate from one direction. The reference direction may be a centre-point of the panorama image and/or the mid-point between the imaging capturing start and end points.

In the first and second aspects described above, the means may comprise: at least one processor; and at least one memory including computer program code, the at least one memory and the computer program code configured, with the at least one processor, to cause the performance of the apparatus.

In a third aspect, this specification describes a method comprising: capturing a plurality of visual images from an image capturing start time to an image capturing end time, for use in generating a panorama image; and capturing audio data (such as mono audio or stereo audio) relating to said visual images from an audio capturing start time to an audio capturing end time. The audio capturing start time may be the same as, or different to, the image capturing start time. Similarly, the audio capturing end time may be the same as, or different to, the image capturing end time.

Some embodiments may comprise defining one or more focus elements within the captured audio data. Captured audio within the focus elements may be amplified. Said focus elements may comprise one or more time periods and/or one or more zones. The one or more focus elements may be user defined (e.g. using a user input, such as a button press on a user interface). Some embodiments further comprise determining said one or more focus element (e.g. without user input, for example by identifying one or more audio sources in some way, such as identifying important audio sources according to some metric. The determination of such focus element(s) may be carried out automatically.

Some embodiments may comprise defining the audio capturing start time and the audio capturing end time. Some embodiments may further comprise determining a smooth trajectory period for said apparatus, wherein the audio capturing start time is defined by (or relative to) a start of said smooth trajectory period and/or the audio capturing end time is defined by (or relative to) an end of said smooth trajectory period.

In a fourth aspect, this specification describes a method comprising: receiving a plurality of visual images from an image capturing start time to an image capturing end time, for use in generating a panorama image; receiving audio data relating to said visual images from an audio capturing start time to an audio capturing end time; and presenting the generated panorama image with the received audio.

Some embodiments may further comprise receiving data relating to one of more focus elements (e.g. time period or areas) within the audio data, wherein the received audio is modified depending on the focus elements. The said focus elements may be defined during an image and/or audio capturing process (e.g. by pressing a button on a user interface).

The received audio may be modified by amplifying received audio within the focus elements. Other audio may be unamplified or handled in some other way (such as attenuated, removed entirely or presented as non-directional background audio).

In the third or fourth aspects, the image capturing start time and the image capturing end time may be user defined (e.g. using a user input, such as a button press on a user interface). Alternatively, or in addition, the audio capturing start time and the audio capturing end time may be user defined (e.g. using a user input, such as a button press on a user interface).

Some embodiments of the third or fourth aspects may comprise defining a field-of-view of audio data for presentation with the panorama image. The field-of-view of the audio data may be scaled by the relative size of a first arc between the image capturing start time and the image capturing end time and a second arc between the audio capturing start time and the audio capturing end time.

Some embodiments of the third or fourth aspects may further comprise: defining a reference direction of the panorama image; and modifying audio in a direction generally opposite to said reference direction, wherein audio in the direction generally opposite to said reference direction is modified such that, when presented with the panorama image, said modified audio appears to originate from one direction. The reference direction may be a centre-point of the panorama image and/or the mid-point between the imaging capturing start and end points.

In a fifth aspect, this specification describes any apparatus configured to perform any method as described with reference to the third or fourth aspects.

In a sixth aspect, this specification describes computer-readable instructions which, when executed by computing apparatus, cause the computing apparatus to perform any method as described with reference to the third or fourth aspects.

In a seventh aspect, this specification describes a computer program comprising instructions for causing an apparatus to perform at least the following: capturing a plurality of visual images from an image capturing start time to an image capturing end time, for use in generating a panorama image; and capturing audio data relating to said visual images from an audio capturing start time to an audio capturing end time. The audio capturing start time may be the same as, or different to, the image capturing start time. Similarly, the audio capturing end time may be the same as, or different to, the image capturing end time.

In an eighth aspect, this specification describes a computer program comprising instructions for causing an apparatus to perform at least the following: receiving a plurality of visual images from an image capturing start time to an image capturing end time, for use in generating a panorama image; receiving audio data relating to said visual images from an audio capturing start time to an audio capturing end time; and presenting the generated panorama image with the received audio.

In a ninth aspect, this specification describes a computer-readable medium (such as a non-transitory computer readable medium) comprising program instructions stored thereon for performing any method as described with reference to the third or fourth aspects.

In a tenth aspect, this specification describes an apparatus (e.g. a user device) comprising: an image capturing device (such as a mobile phone or similar device, or a camera) for capturing a plurality of visual images from an image capturing start time to an image capturing end time, for use in generating a panorama image; and an audio capturing device for capturing audio data relating to said visual images from an audio capturing start time to an audio capturing end time.

In an eleventh aspect, this specification describes an apparatus (e.g. at a server side) comprising: a first input for receiving a plurality of visual images from an image capturing start time to an image capturing end time, for use in generating a panorama image; a second input for receiving audio data relating to said visual images from an audio capturing start time to an audio capturing end time; and an output module for presenting the generated panorama image with the received audio. Some embodiments may include a processor for generating the panorama image (e.g. from some or all of the plurality of received visual images).

BRIEF DESCRIPTION OF THE DRAWINGS

So that the invention may be fully understood, embodiments thereof will now be described with reference to the accompanying drawings, in which.

DETAILED DESCRIPTION

Figure 1:
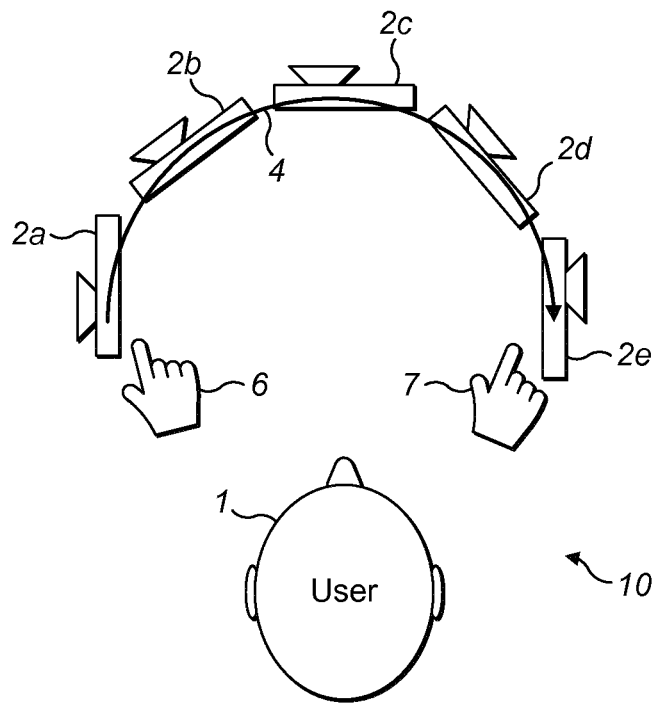
FIG. 1 is a block diagram of a system in accordance with an example embodiment.

In the description and drawings, like reference numerals refer to like elements throughout.

FIG. 1 is a block diagram of a system, indicated generally by the reference numeral 10, in accordance with an example embodiment. The system 10 comprises a user 1 and an imaging device 2, such as a camera (e.g. a mobile phone camera). The imaging device 2 captures a plurality of visual images (as indicated in FIG. 1 by the imaging device positions 2a, 2b, 2c, 2d and 2e) from an image capturing start time to an image capturing end time.

The image capturing start time may be indicated by a user, for example by pressing a button on a user interface or otherwise activating a user interface; this is represented by a first user input indication 6 in FIG. 1. Similarly, the image capturing end time may be indicated by a user, for example by pressing a button on a user interface or otherwise activating a user interface; this is represented by a second user input indication 7 in FIG. 1.

As shown in FIG. 1, the imaging device 2 moves along an arc 4 as it moves from position 2a to position 2e (i.e. between image capturing start time and an image capturing end time). In this way, the camera 2 is used to capture multiple images (e.g. photographs) that are stitched together to generate the panorama, in a manner known in the art. The camera 2 may include one or more microphones for capturing audio data. A short audio clip (such as mono audio or stereo audio) may be recorded for presentation with the panorama. The audio clip may be captured from an audio capturing start time to an audio capturing end time. The audio capturing start and end times may be the same as the image capturing start and end times; however, as discussed further below, this is not essential to all embodiments.

Figure 2:
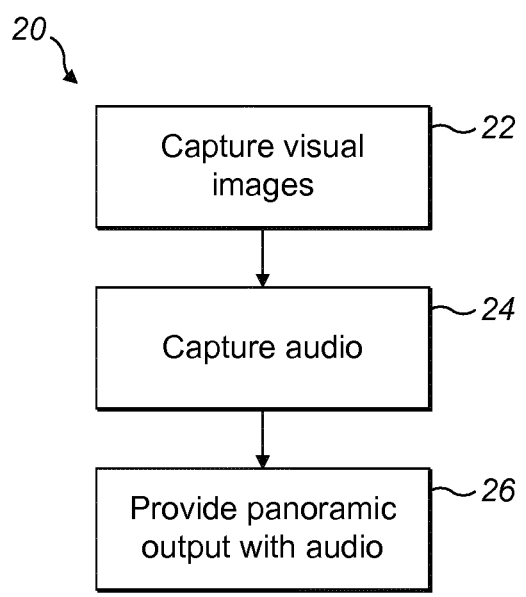
FIG. 2 is a flow chart showing an algorithm in accordance with an example embodiment.

FIG. 2 is a flow chart showing an algorithm, indicated generally by the reference numeral 20, in accordance with an example embodiment.

The algorithm 20 starts at operation 22, where visual images are captured, for example by the imaging device 2 described above. At operation 24 (which may be conducted in parallel with the operation 22), audio is captured, for example by the imaging device 2.

At operation 26, a panoramic output is generated, including multiple images captured in the operation 22 that are stitched together to generate the panorama, together with audio data (e.g. a short audio clip) captured in operation 24.

In the event that spatial audio is captured, the spatial audio playback that forms part of the panorama output should enable sound sources to be heard in the appropriate direction. With images, the sound sources visible in the image should have their sound coming from a direction that corresponds to the source location in the image.

A problem with combining still images for panoramas with spatial audio is that the panorama is made of several images captured (e.g. in the operation 22 described above) in different directions at different times. If the audio captured in the operation 24 is captured using the same device (e.g. a mobile phone), then the audio is also captured with the device pointing in different directions at different times. If the audio is played to the user as captured, the sound sources appear to be rotating, whereas the panorama does not rotate. Therefore, the sound sources may be counter-rotated in the captured audio, countering the device rotation during capture.

There are many different methods for rotating audio; these include ambisonics based rotation and parametric audio based rotation.

Parametric audio has a direction parameter that can be rotated directly by changing the direction parameter. An example of a parametric audio format is DirAC (Directional Audio Coding). One example of DirAC estimates the directions and diffuseness ratios (equivalent information to a direct-to-total ratio parameter) from a first-order Ambisonic (FOA) signal, or its variant the B-format signal.

$$FOA_i(t) = \begin{bmatrix} w_i(t) \\ x_i(t) \\ y_i(t) \\ z_i(t) \end{bmatrix}$$

The signals of $\Sigma_{i=1}^{NUM\_CH} FOA_i(t)$ are transformed into frequency bands for example by a short-term Fourier transform (STFT), resulting in time-frequency signals w(k,n), x(k,n), y(k,n), z(k,n) where k is the frequency bin index and n is the time index. DirAC estimates the intensity vector by:

$$I(k, n) = -\text{Re}\left\{w(k, n) * \begin{bmatrix} x(k, n) \\ y(k, n) \\ z(k, n) \end{bmatrix}\right\},$$

where Re means the real part, and asterisk * means the complex conjugate.

The direction parameter is opposite to the direction of the real part of the intensity vector. The intensity vector may be averaged over several time and/or frequency indices prior to the determination of the direction parameter.

When averaged, the direction parameters may be determined in frequency bands combining several frequency bins k, for example, approximating the Bark frequency resolution.

Figure 3:
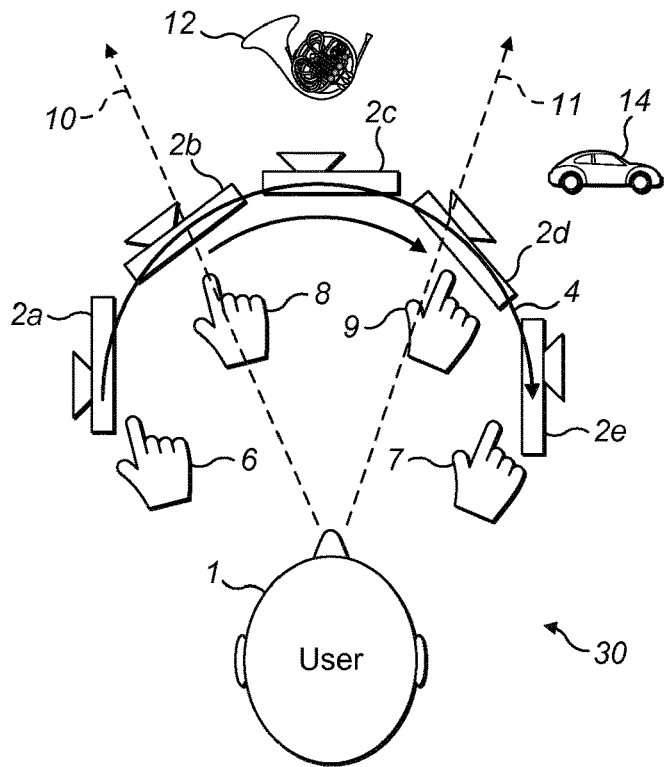
FIG. 3 is a block diagram of a system in accordance with an example embodiment.

FIG. 3 is a block diagram of a system, indicated generally by the reference numeral 30, in accordance with an example embodiment.

The system 30 comprises the user 1, the imaging device 2, the imaging device positions 2a, 2b, 2c, 2d and 2e, and the arc 4 through which the imaging device 2 moves from an image capturing start time to an image capturing end time. As with the system 10 described above, the image capturing start time may be indicated by a user, for example by the first user input indication 6 and the image capturing end time may be indicated by a user, for example by the second user input indication 7.

The system 30 also includes a first sound source 12 and a second sound source 14. Assume that the first sound source 12 (a musical instrument) provides an audio signal that the user 1 wants to capture and that the second sound source 14 (a car) is background noise that the user 1 would prefer to supress. For example, the user may be capturing a scene at a music recital in which the sound from the musical instrument 12 is relevant at all times and the sound from the car 14 is background noise at all times.

As the imaging device 2 moves along the arc 4, the focus of the captured visual images may be dependent on the direction of the imaging device. For example, whilst in the position 2c, the imaging device may focus on the musical instrument 12, and whilst in the position 2d, the imaging device may focus on the car 14. The audio output could be similarly focussed in the direction of the imaging device. However, this would result in the audio output only be focussed on the musical instrument 12 for the time period in which the imaging device was in or near the position 2c.

Figure 4:
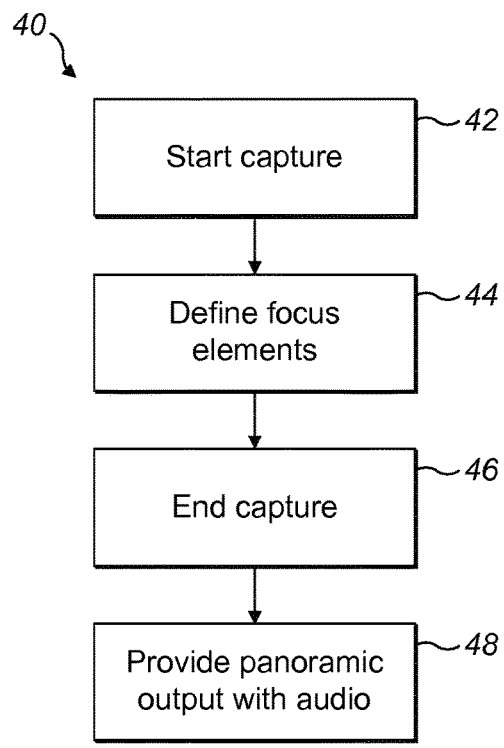
FIG. 4 is a flow chart showing an algorithm in accordance with an example embodiment.

FIG. 4 is a flow chart showing an algorithm, indicated generally by the reference numeral 40, in accordance with an example embodiment. The algorithm 40 starts at operation 42 where image and audio capture is started. The operation 42 may start at the image capturing start time indicated by the first user input indication 6.

At operation 44, a focus element is defined. The focus element may define one or more time periods or areas of the captured audio data that the user wishes to be the focus of the audio output.

A user interface may be provided to enable a user to define one or more focus elements. By way of example, a focus start time may be indicated by a user, for example by pressing a button on a user interface or otherwise activating a user interface; this is represented by a third user input indication 8 in FIG. 3. Similarly, a focus end time may be indicated by a user, for example by pressing a button on a user interface or otherwise activating a user interface; this is represented by a fourth user input indication 9 in FIG. 3. Thus, the third and fourth user input indications 8 and 9 provide a focus time period. Of course, although a single focus time period is shown in the example of FIG. 3, multiple focus time periods could be identified.

At operation 46, the end of the audio and visual data capture is indicated. The operation 46 may occur when the second user input indication 7 is received.

At operation 48, a panoramic output is generated, including multiple images captured as the imaging device 2 moves, for example, from the imaging device positions 2a to the imaging device position 2e, that are stitched together to generate the panorama, together with captured audio data. The audio may be provided, for example, such that audio within the focus zone is amplified and/or such that audio outside the focus zone is attenuated. Other arrangements for focusing the audio outputs are also possible.

The third and fourth user input indications 8 and 9 may be provided at a device display (e.g. at a user interface of the imaging device) whilst the user is taking a panorama. Although two inputs are shown in FIG. 3, a single user input may be provided, which user input may be held for the duration of the focus period. Sound sources within the indicated zone (such as the musical instrument 12) are considered to be interesting for the user. The gesture may be intuitive because the user may see the interesting sound sources in the device display during panorama shot. The user may either touch-and-hold the display (for example, for the duration in which the interesting sound source is in focus) or touch the display twice (once to indicate the start of the focus zone and once to indicate the end).

Device orientation can be detected in a number of different ways, such as one or more of: directly detecting device orientation with a compass; detecting device orientation change in time using accelerometers; taking images at different time instants and detecting how much movement there is between the images and combining that with knowledge of the focal length of the lens etc. Other options will be apparent to those skilled in the art.

Sound amplification may also be implemented by a number of different methods. Two such methods are described below.

In a first method, audio is captured during panorama capture from two or more microphones. Device orientation is recorded, for example, during panorama capture using compass, accelerometers, device camera etc. (as discussed above). A beamformed mono audio signal may be created from the captured audio by changing the beam direction based on the recorded device orientation so that the beam points to the interesting sector. The beamformed audio signal may be combined with the panorama image.

In addition to, or instead of, the beamformed mono signal discussed above, a spatial (stereo, binaural, 5.1 etc) signal may be created from two or more microphones in the device, for example using known methods for creating a DirAC signal or an ambisonics signal. The spatial signal may be rotated according to the device movement and the beamformed signal added to at least some or all channels of the spatial signal. The beamformed signal may be panned to the direction of the interesting sector before the addition. Relative loudness of the beamformed and spatial signals may depend on the pressure of the touch gesture.

As indicated above, multiple audio focus zones may be enabled. The user may, for example, indicate the plurality of audio focus zones (using a user interface). For example, a user input may be provided for each of a plurality of focus zones. This can be quite intuitive, with the user simply pressing (and possibly holding) a button when the camera is directed towards an area in which audio signals are of interest.

As described above, a user may indicate one of more focus zones (for example using a user interface of the image capturing device). This is not essential to all embodiments. For example, a means may be provided for determining the one of more focus elements, which means may determine focus elements without requiring user input. For example, an algorithm may be provided for determining one or more likely key sound sources within a captured image. The identified key sound source(s) may be amplified and/or other sound sources attenuated. Beamformed signals may be created that amplify sounds in each focus zone. Each beamformed signals may be panned to a different direction that corresponds to the direction of the focus zone.

As described above, the audio capturing start time may be the same as the image capturing start time and/or the audio capturing end time may be the same as the image capturing end time. This is not essential to all embodiments.

Figure 5:
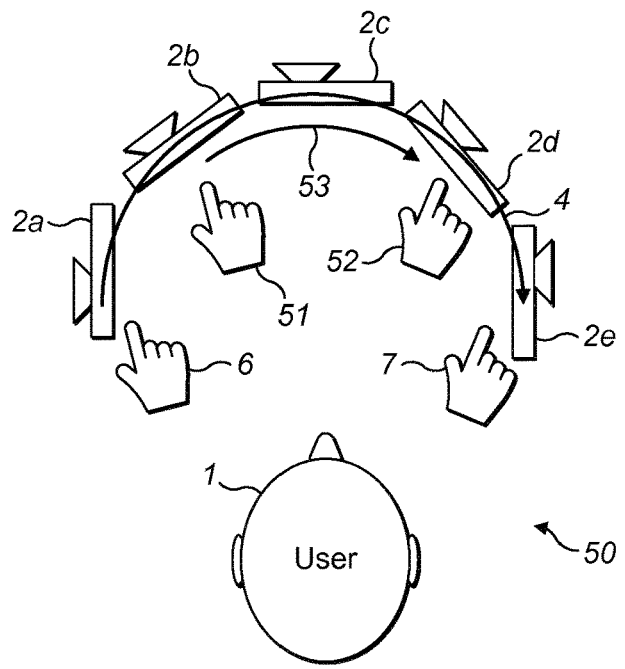
FIG. 5 is a block diagram of a system in accordance with an example embodiment.

FIG. 5 is a block diagram of a system, indicated generally by the reference numeral 50, in accordance with an example embodiment.

The system 50 comprises the user 1, the imaging device 2, and the imaging device positions 2a, 2b, 2c, 2d and 2e described above. As with the systems 10 and 30, the image capturing device moves along an arc 4 as it moves from position 2a to position 2e.

Figure 6:
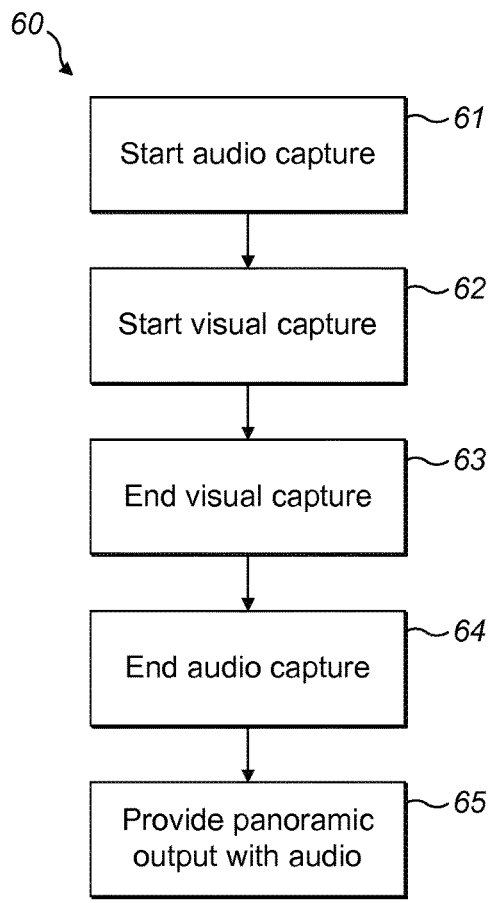
FIG. 6 is a flow chart showing an algorithm in accordance with an example embodiment.

FIG. 6 is a flow chart showing an algorithm, indicated generally by the reference numeral 60, in accordance with an example embodiment. The algorithm 60 shows an example use of the system 50.

The algorithm 60 starts at operation 61, where audio capture is started. In an example embodiment, the audio capture is started at a time indicated by the first user input indication 6 (i.e. when the image capturing device is in the position 2a).

Next, at operation 62, visual capture is started. In an example embodiment, the visual capture is started at a time indicated by a fifth user input indication 51 (when the image capturing device is in the position 2b). The visual capture ends at operation 63 of the algorithm 60. In an example embodiment, the visual capture ends at a time indicated by a sixth user input indication 52 (when the image capturing device is in the position 2d).

At operation 64, the audio capture ends. In an example embodiment, the audio capture ends at a time indicated by the second user input indication 7 (when the image capturing device is in the position 2e).

With both the audio and visual capture complete, a panoramic output with audio is provided at operation 65. The panoramic output includes multiple images captured as the imaging device moves along an arc 53 between the fifth and sixth user indications 51 and 52 that are stitched together to generate the panorama, together with audio data captured as the imaging device moves along the arc 4 between the first and second user indications 6 and 7. Thus, in the algorithm 60, the audio capturing start time is different to (i.e. earlier than) the image capturing start time and the audio capturing end time is different to (i.e. later than) the image capturing end time.

The audio capturing start time and end times may be indicated by a user, for example by pressing a button on a user interface or otherwise activating a user interface (as represented by the user input indications 6 and 7). Similarly, the image capturing start and end times may be indicated by a user, for example by pressing a button on a user interface or otherwise activating a user interface (as represented by the user input indications 51 and 52).

Figure 7:
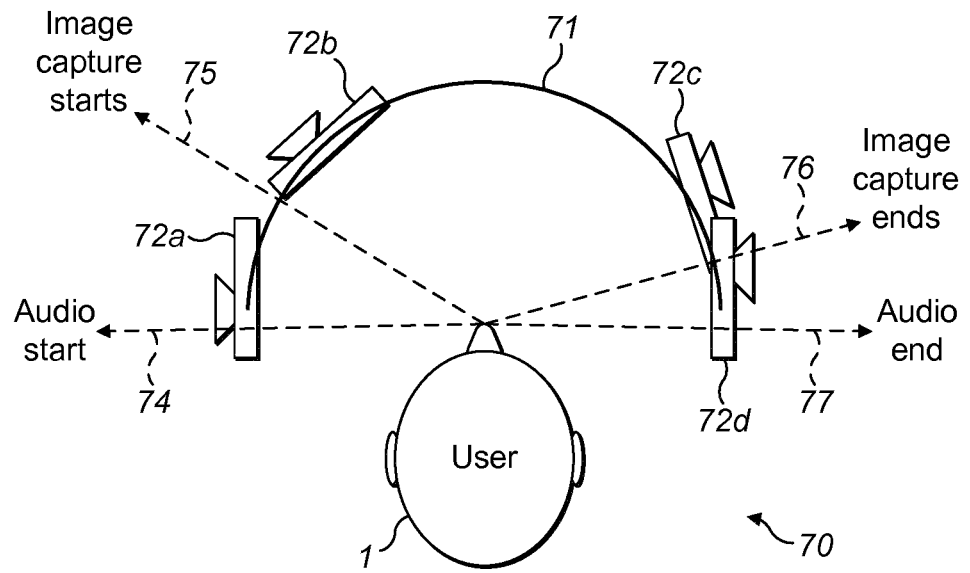
FIG. 7 is a block diagram of a system in accordance with an example embodiment.

The user input indications 6, 7, 51 and 52 shown in FIG. 5 are provided by way of example only. Those indications could be provided at any time. FIG. 7 is a block diagram of a system, indicated generally by the reference numeral 70, in accordance with an example embodiment. The system 70 includes the user 1 described above and an imaging device 72 (similar to the imaging device 2 described above). The imaging device 72 moves along a path 71. A number of imaging device position 72a, 72b, 72c and 72d along the path 71 are shown.

An audio start direction 74 is shown indicating the imaging device position at which the audio capture is started (operation 61 of the algorithm 60). Similarly, an imaging capture start position 75 (operation 62), an image capture end position 76 (operation 63) and an audio capture end position 77 (operation 64) are shown. The positions 74 to 77 are not symmetric. Indeed, those positions, which may be user-defined, may be located at any position along the path 71.

Captured audio data that is provided with a panoramic output (in the operations 26, 48 and 65 described above, for example) may be looped (i.e. repeated for the duration of the presentation of the panoramic image. Alternatively, the captured audio may be played only once when the panorama is viewed. Whichever is the case, a longer audio signal may be preferred, for example to improve an immersive experience for a viewer of the panorama. Looping short audio clips can be annoying and a single short audio clip may not contain much information of the audio scene. In the algorithm 60, the audio capture period is longer than the image capture period, thereby increasing the length of the audio clip that can be provided with the panorama.

In some embodiments, it may be attempted to record audio signals for as long as possible. For example, the image capturing device 2 or 72 could start to record audio as soon as a panorama application is started, or even earlier. One potential problem with this approach is that a user may move the device (e.g. a mobile phone or other imaging device) significantly before starting to take the panorama and this may cause the device trajectory to be so complicated that rotating the audio to account for the device movement becomes difficult (perhaps prohibitively difficult). Moreover, the user may change the way in which they hold the audio capturing device, and this may cause handling noise. Furthermore, a user may say things about the device handling or subject positions like "Hey, move there!" before they start taking the panorama; such audio may be undesirable in the presented panorama.

Figure 8:
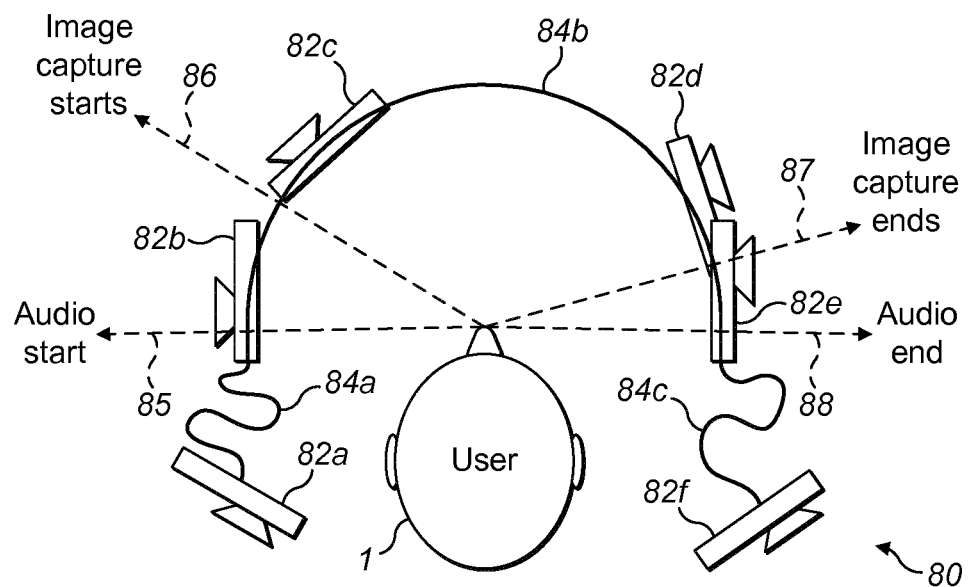
FIG. 8 is a block diagram of a system in accordance with an example embodiment.

FIG. 8 is a block diagram of a system, indicated generally by the reference numeral 80, in accordance with an example embodiment.

The system 80 comprises the user 1 described above, an imaging device 82 (similar to the imaging devices 2 and 72 described above), and imaging device positions 82a, 82b, 82c, 82d 82e and 82f. The imaging device moves along an arc 84 as it moves from position 82a to position 82f.

The arc 84 includes a first portion 84a, where the imaging device is moved significantly, in a non-smooth manner, a second portion 84b, where the imaging device is moved in a smooth trajectory, and a third portion 84c, where the imaging device is again moved significantly, in a non-smooth manner.

Figure 9:
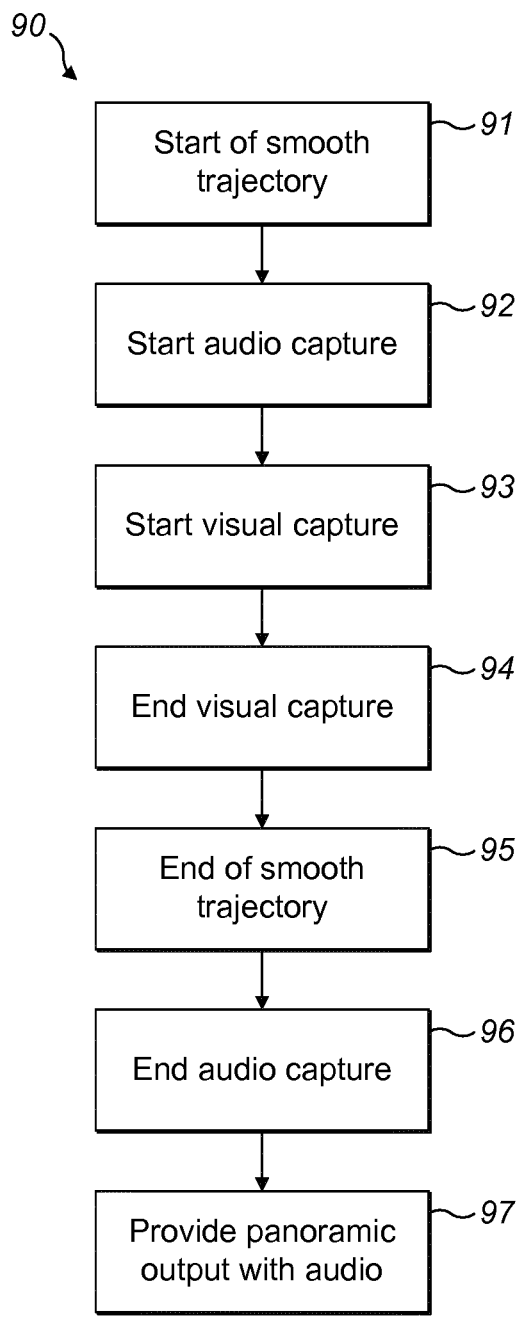
FIG. 9 is a flow chart showing an algorithm in accordance with an example embodiment.

FIG. 9 is a flow chart showing an algorithm, indicated generally by the reference numeral 90, in accordance with an example embodiment.

The algorithm 90 starts at operation 91, where a start of a smooth trajectory of the imaging device 82 is determined. Thus, in the example system 80, the operation 91 determines the start of the second portion 84b of the arc 84. At operation 92, audio capture is started. Thus, the audio capture is started once a smooth trajectory is determined (e.g. when the image capturing device is in the position 85 shown in FIG. 8).

Next, at operation 93, visual capture is started. In an example embodiment, the visual capture is started at a time indicated by a user input indication. This may occur when the image capturing device is in the position 86 shown in FIG. 8. The visual capture ends at operation 94 of the algorithm 90. In an example embodiment, the visual capture ends at a time indicated by a user input indication. This may occur when the image capturing device is in the position 87 shown in FIG. 8.

At operation 95, an end of a smooth trajectory of the imaging device 82 is determined. Thus, in the example system 80, the operation 95 determines the end of the second portion 84b of the arc 84. At operation 96, the audio capture ends. Thus, the audio capture is ended once the end of the smooth trajectory is determined (e.g. when the image capturing device is in the position 82e shown in FIG. 8). Thus, an audio capturing start period may be defined by a start of said smooth trajectory period and the audio capturing end time may be defined by an end of said smooth trajectory period.

With both the audio and visual capture complete, a panoramic output with audio is provided at operation 97. The panoramic output includes multiple images captured as the imaging device moves along an arc 84b between the image capture start time 86 and the image capture end time 87 that are stitched together to generate the panorama, together with audio data captured as the imaging device moves along the arc 84 between the audio capture start time 85 and the audio capture end time 88.

In one embodiment, audio is captured all the time that a panorama application is running (or even longer), but audio data is only stored when the device is held stable or on a smooth trajectory (e.g. on the second portion 84b of the path). Other captured audio data may be discarded.

A device trajectory may be detected in a number of different ways, for example using one or to more of a compass, accelerometers, device camera etc. The smooth part of the device trajectory may be the time during which the device orientation and/or position does not differ, for example, by more than a threshold amount from a curvilinear path.

In the algorithm 90, the audio captured may be mono audio, stereo audio, binaural audio, ambisonics audio, multichannel audio etc.

Mono audio may be recorded using at least one microphone when the imaging device 82 is moving along the arc 84 (i.e. during the first, second and third portions 84a, 84b and 84c of the arc 84). The mono audio may be cropped to between the audio capture start time 85 and the audio capture end time 88.

One or more microphones may be used to record the audio. The audio may be ambisonics, DirAC, stereo, 5.1, parametric or anything that can be rotated. Only audio between the audio capture start time 85 and the audio capture end time 88 may be used.

In this implementation, an image (referred to here as the left image) that is used to make the leftmost part of the panorama generated in operation 97 and the image (referred to herein as the right image) that is used to make the rightmost part of the panorama generated in the operation 97 may be used together with orientations in deciding how captured audio is rotated.

Audio that was captured when the device was taking the left image may be rotated so that sound sources in front of the camera after rotation appear to the left and sound sources in other directions are rotated correspondingly. Rotation may be carried out in a horizontal plane. Similarly, audio that was captured when the device was taking the right image may be rotated so that sound sources in front of the camera after rotation appear to the right and sound sources in other directions are rotated correspondingly.

Panoramas are often taken with the imaging device moving from left to right. There may be audio before the left portion and after the right portion. Audio before the left portion (between the audio capture start time 85 and the image capture start time 86) and after the right portion (between the image capture end time 87 and the audio capture end time 88) may be rotated directly based on the device direction or a fixed direction may be used so that the device direction for time between the audio capture start time 85 and the image capture start time 86 is assumed to be the same as at image capture start time and the device direction for time between the image capture end time 87 and the audio capture end time 88 is assumed to be the same as at image capture end time.

Audio between the left and right portions may be rotated as follows.

First, define the device orientation (e.g. camera direction) when the left image was taken at the image capture start time 86 as α, where α is an angle on the horizontal plane. We can define without loss of generality that α=0 (degrees) points north, α=90 points west, α=−90 points east, and α=180 points south. Similarly, define β as an angle pointing to the camera direction when the right image was taken at the image capture end time 87. Let θ be a device orientation for a portion (called between portion) of the audio between left and right portions.

Audio in the left portion is rotated by 90 degrees and audio in the right portion is rotated by −90 degrees.

Audio in all between portions is rotated by:

$$\left(1 - 2\frac{\alpha - \theta}{\alpha - \beta}\right) \times 90 \text{ degrees.}$$

Note that the term "north" as used above does not need to be the actual geographical north, but may be any reference direction (e.g. the centrepoint of the panorama). Device orientation can, for example, be detected using device accelerometer, compass, or device camera etc.

A similar rotation equation can also be used for audio between times audio capture start time 85 and the audio capture end time 88.

Similar audio rotation arrangements may be implemented in other embodiments described herein.

When taking a panorama image, a user may control the width of the panorama image, for example, by choosing start and end capture points of the image (as discussed above). However, it is more difficult to control a width of the audio related to the panorama.

For example, in the system 80, the width of the sound sources in the panorama audio was fixed to the width of the panorama image. Sound sources to the left of the image were on the left in the audio and sound sources on the right of the panorama image were on the right in the audio. A user may want to control the locations of the sound sources i.e. the width of the audio. For example, if the panorama image has a narrow field-of-view (FOV), the user may want to keep the audio narrow too, if the important audio sources are all in the front (e.g. if the image is a portrait or a single fountain etc.). Alternatively, if the audio scene is naturally very wide (e.g. a jungle with noisy animals around the user, or a street performance with performers around the user), the user may want to have the audio scene wide in the panorama too regardless of the field-of-view of the panorama image.

Figure 10:
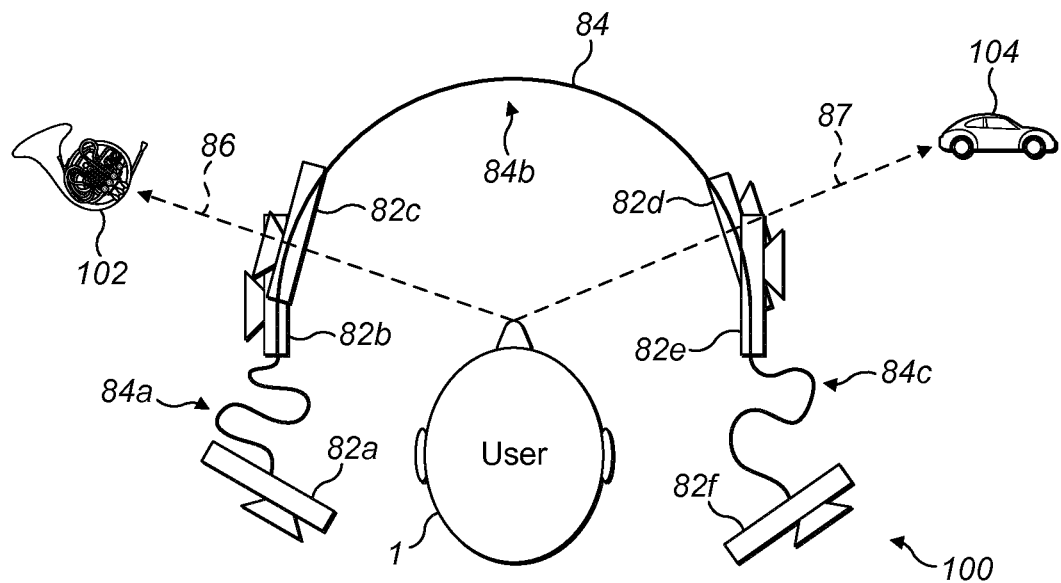
FIG. 10 is a block diagram of a system in accordance with an example embodiment.

FIG. 10 is a block diagram of a system, indicated generally by the reference numeral 100, in accordance with an example embodiment.

The system 100 comprises the user 1 and the imaging device 82 (including the device positions 82a, 82b, 82c, 82d 82e and 82f) described above. The imaging device 82 moves along the arc 84 as it moves from position 82a to position 82f. As discussed above, the arc 84 includes a first portion 84a, where the imaging device is moved significantly, in a non-smooth manner, a second portion 84b, where the imaging device is moved in a smooth trajectory, and a third portion 84c, where the imaging device is again moved significantly, in a non-smooth manner.

As described above, audio capture is started at a start of a smooth trajectory of the imaging device 82 (e.g. at the device position 82b) and continues until an end of the smooth trajectory (e.g. at the device position 82e). Further, visual capture is started at a time indicated by a user input indication (e.g. at the position 86) and the visual capture ends at a time indicated by a user input indication (e.g. at the position 87).

Figure 11:
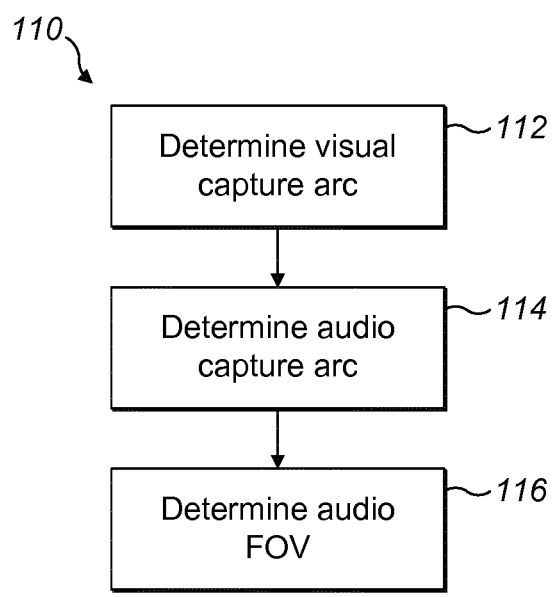
FIG. 11 is a flow chart showing an algorithm in accordance with an example embodiment.

FIG. 11 is a flow chart showing an algorithm, indicated generally by the reference numeral no, in accordance with an example embodiment.

The algorithm 110 starts at operation 112, wherein a size of a first arc between the image capturing start time 86 and the image capturing end time 87 is determined. At operation 114, a size of a second arc between the audio capturing start time and the audio capturing end time is determined. Note, of course, that the order of the operations 112 and 114 could be reversed, or those operations could be carried out in parallel.

At operation 116, a field-of-view of the audio data is scaled by the relative size of the first arc (between the image capturing start time and the image capturing end time) and the second arc (between the audio capturing start time and the audio capturing end time).

For example, let $\gamma$ be the device orientation at the audio capturing start time (e.g. the beginning of the smooth trajectory) and let the device orientation be $\delta$ at the audio capturing end time (e.g. the end of the smooth trajectory). Audio in portions between the audio capturing start and end times is rotated according to the following equation:

$$\left(1 - 2\frac{\alpha - \theta}{\alpha - \beta}\right)\frac{\alpha - \beta}{\gamma - \delta} 90 \text{ degrees}$$

Where $\alpha$, $\beta$ and $\theta$ are as defined above.

This means that the width of the audio is scaled by the ratio of the angle of the arc defined by device orientations at the image capturing start and end times and the angle of the arc defined by device orientations at the audio capturing start and end times.

Figure 12:
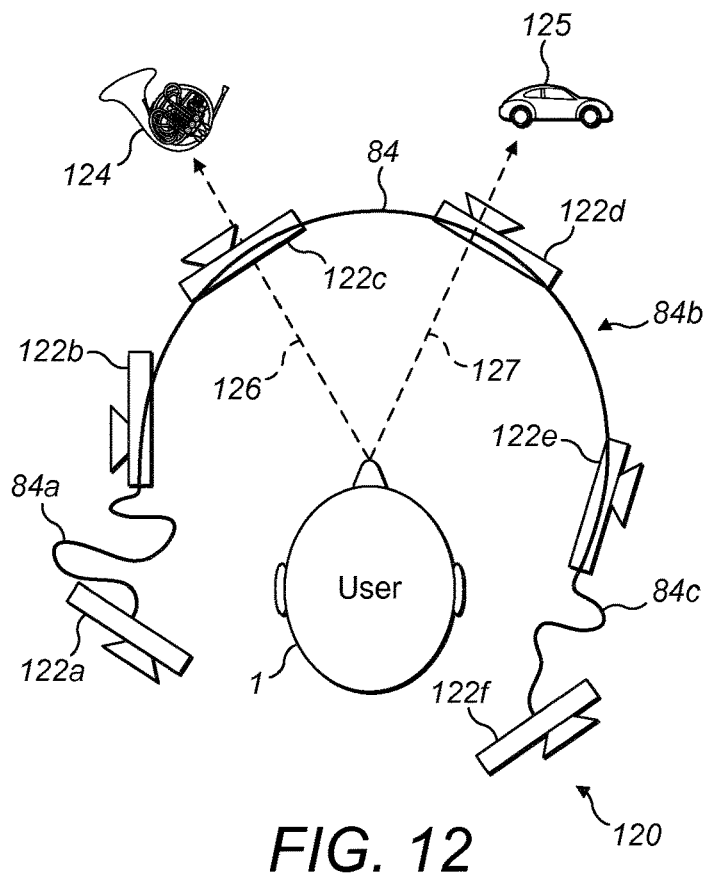
FIG. 12 is a block diagram of a system in accordance with an example embodiment.

FIG. 12 is a block diagram of a system, indicated generally by the reference numeral 120, in accordance with an example embodiment.

The system 120 comprises the user 1 described above and an imaging device 122 (similar to the imaging device 82). The imaging device 122 includes device positions 122a, 122b, 122c, 122d 122e and 122f. The imaging device 122 moves along the arc 84 as it moves from position 122a to position 122f. As discussed above, the arc 84 includes a first portion 84a, where the imaging device is moved significantly, in a non-smooth manner, a second portion 84b, where the imaging device is moved in a smooth trajectory, and a third portion 84c, where the imaging device is again moved significantly, in a non-smooth manner.

As described above, audio capture is started at a start of a smooth trajectory of the imaging device 122 (at the device position 122b) and continues until an end of the smooth trajectory (at the device position 122e). Further, visual capture is started at a time indicated by a user input indication (at the position 126) and the visual capture ends at a time indicated by a user input indication (at the position 127).

Figure 13:
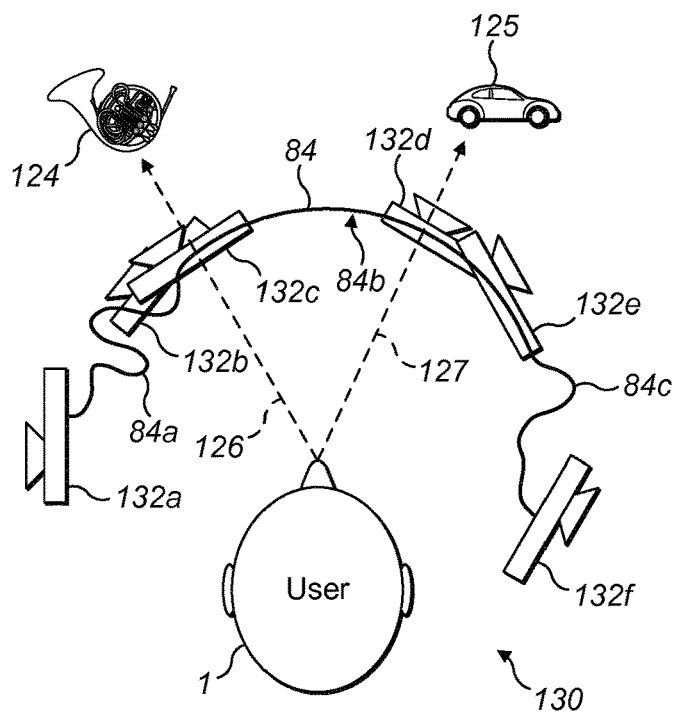
FIG. 13 is a block diagram of a system in accordance with an example embodiment.

FIG. 13 is a block diagram of a system, indicated generally by the reference numeral 130, in accordance with an example embodiment.

The system 130 comprises the user 1 described above and an imaging device 132 (similar to the imaging devices 82 and 122). The imaging device 132 includes device positions 132a, 132b, 132c, 132d 132e and 132f. The imaging device 132 moves along the arc 84 as it moves from position 132a to position 132f. As discussed above, the arc 84 includes a first portion 84a, where the imaging device is moved significantly, in a non-smooth manner, a second portion 84b, where the imaging device is moved in a smooth trajectory, and a third portion 84c, where the imaging device is again moved significantly, in a non-smooth manner.

As described above, audio capture is started at a start of a smooth trajectory of the imaging device 132 (at the device position 132b) and continues until an end of the smooth trajectory (at the device position 132e). Further, visual capture is started at a time indicated by a user input indication (at the position 126) and the visual capture ends at a time indicated by a user input indication (at the position 127).

The visual scene (which extends roughly from the musical instrument 124 to the car 125) is the same in both the systems 120 and 130, and is narrower than the visual scene in the example system 100 described above.

As discussed above, the field-of-view of the audio data is scaled by the relative size of a first arc between the image capturing start time and the image capturing end time and a second arc between the audio capturing start time and the audio capturing end time. Thus, the field-of-view of the audio data is wider in the system 120 than the system 130.

Accordingly, the system 100 could be considered to have a wide visual field-of-view and a wide audio field-of-view, the system 120 could be considered to have a narrow visual field-of-view and a wide audio field-of-view, and the system 130 could be considered to have a narrow visual field-of-view and a narrow audio field-of-view.

It should be noted that the particular arrangement for setting the audio capturing start time and the audio capturing end times of the systems 100, 120 and 130 are not essential to all embodiments in which the audio field-of-view of the audio output is controlled.

A user may keep the image and audio capturing device at an arm's length when capturing the panorama. As the device travels on a trajectory, the user may be in various different positions with respect to the device during sound capture (e.g. if the user remains stationary and the capturing device is moved). Therefore, any user voice in the recorded spatial audio may appear to be coming from different directions as the imaging device moves. The problem is exacerbated if sound source distances are not detected because the user is so close to the device that no fixed assumption of user distance can fix the problem completely.

This problem can be partially addressed by assuming a distance to the sound sources and calculating a centre point for the trajectory as a mean of the trajectory points and fixing the direction based on these. Such a solution may affect close-by sound sources more than distant sound sources. The most important close-by sound source is typically the user's own voice and we focus on fixing that below.

Figure 14:
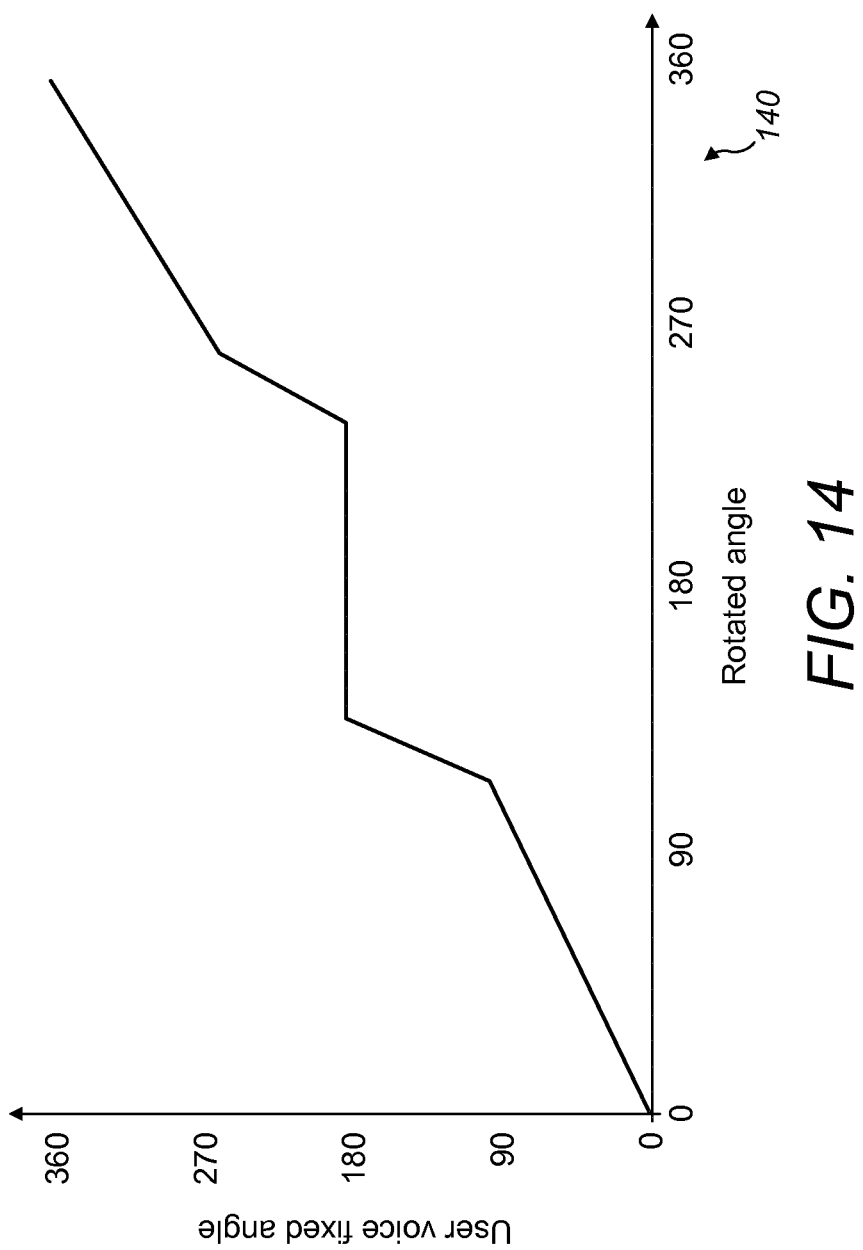
FIG. 14 is a graph in accordance with an example embodiment.

When a panorama is viewed, the user taking the panorama is typically not visible in the panorama. It may be desired that any user voice remains in a constant location. One way to achieve this would modify all sounds coming from an angle behind the device (e.g. 110-250 degrees) such that they are represented as coming from closer to directly behind the device (180 degrees). This direction "directly behind the device" may be defined as the opposite direction to a centre direction of panorama image. One method for doing this is to apply an additional angle fixing to the previously rotated (as described above) angle. FIG. 14 is a graph in accordance with an example embodiment, illustrating an example function, indicated generally by the reference numeral 140, that achieves this. The function 140 is characterized by a rather flat section around the 180 degrees point on x and y axis and steeper sections on the rear leaf and rear right directions that steers sound directions behind the device to a fixed direction at 180 degrees.

Figure 15:
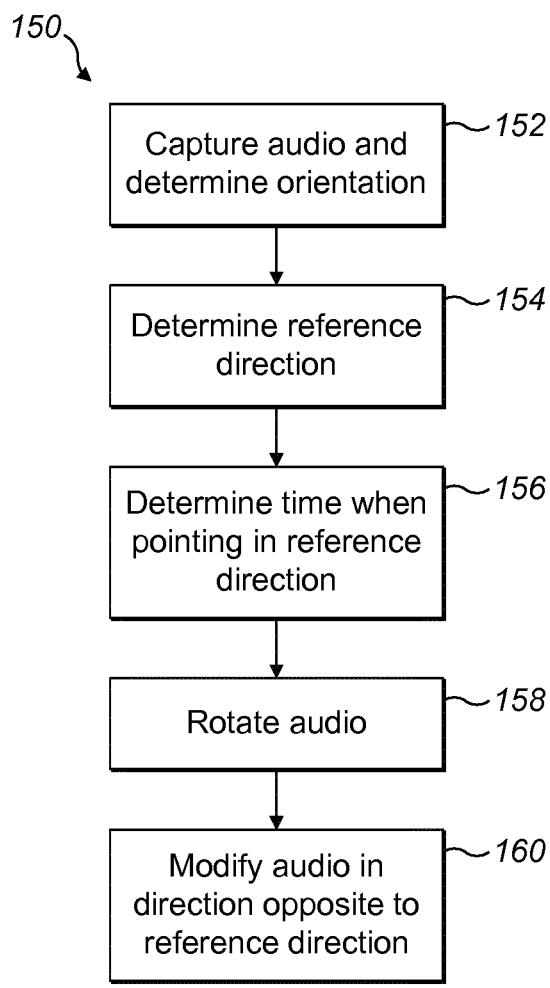
FIG. 15 is a flow chart showing an algorithm in accordance with an example embodiment.

FIG. 15 is a flow chart showing an algorithm, indicated generally by the reference numeral 150, in accordance with an example embodiment.

The algorithm starts at operation 152 where a device captures audio and image data and determines its orientation (e.g. using accelerometers or camera images) during image capture. At operation 154, a reference direction is determined. The reference direction may, for example, be a centre point of the panorama image.

At operation 156, the apparatus determines a time instance when it was pointing at the determined reference direction during the audio and image capturing process and, at operation 158, the device rotates audio data differently for audio captured before and after that determined time instance.

At operation 160, the device modified audio in a range of directions opposite to the reference direction by making all audio in the range come from one direction (e.g. directly opposite to the reference direction).

Figure 16:
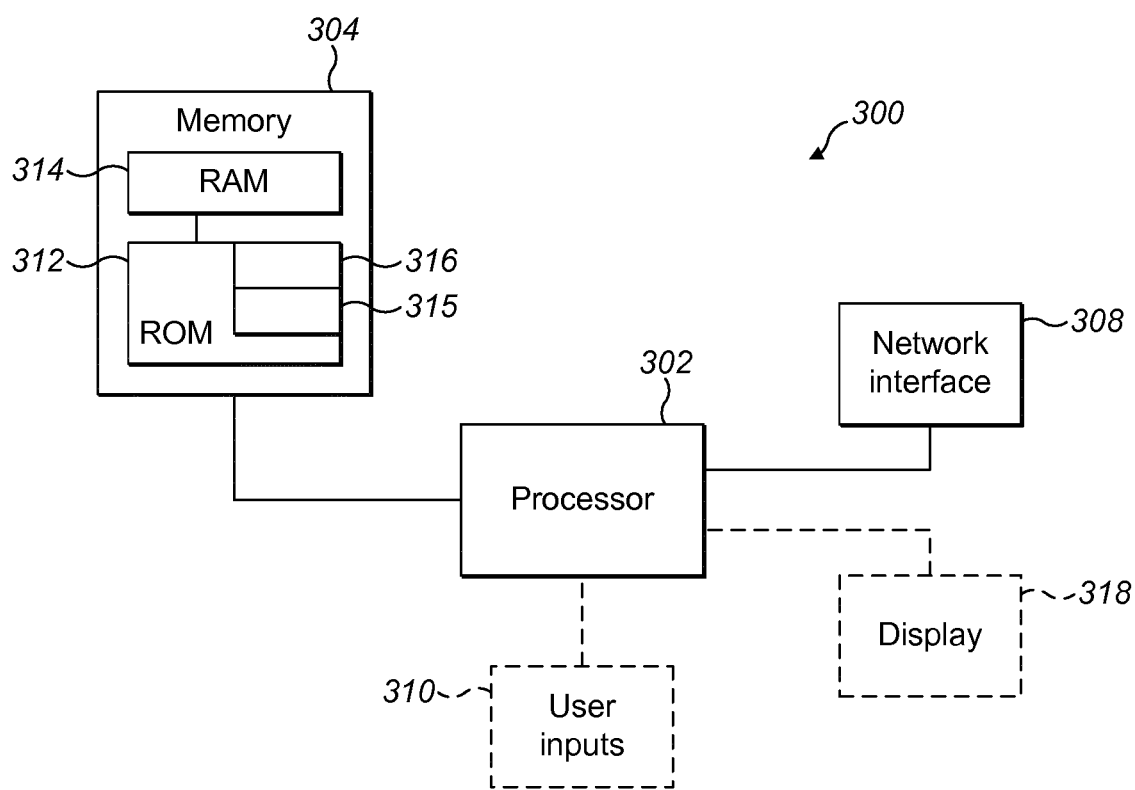
FIG. 16 is a block diagram of components of a system in accordance with an exemplary embodiment.

For completeness, FIG. 16 is a schematic diagram of components of one or more of the example embodiments described previously, which hereafter are referred to generically as processing systems 300. A processing system 300 may have a processor 302, a memory 304 closely coupled to the processor and comprised of a RAM 314 and ROM 312, and, optionally, user input 310 and a display 318. The processing system 300 may comprise one or more network/apparatus interfaces 308 for connection to a network/apparatus, e.g. a modem which may be wired or wireless. Interface 308 may also operate as a connection to other apparatus such as device/apparatus which is not network side apparatus. Thus direct connection between devices/apparatus without network participation is possible. User input 310 and display 318 may be connected to a remote processor like ground control station. Remote connection may be LTE or 5G type fast connection between remote processor and processor.

The processor 302 is connected to each of the other components in order to control operation thereof.

The memory 304 may comprise a non-volatile memory, such as a hard disk drive (HDD) or a solid state drive (SSD). The ROM 312 of the memory 314 stores, amongst other things, an operating system 315 and may store software applications 316. The RAM 314 of the memory 304 is used by the processor 302 for the temporary storage of data. The operating system 315 may contain code which, when executed by the processor implements aspects of the algorithms 20, 40, 60, 90, 110 and 150 described above. Note that in the case of small device/apparatus the memory can be most suitable for small size usage i.e. not always hard disk drive (HDD) or solid state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size.

In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 17A:
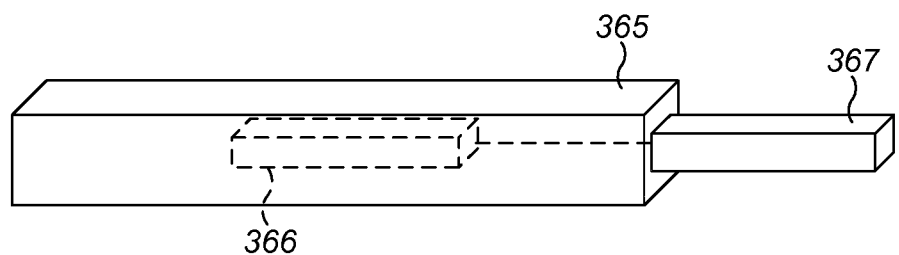
FIGS. 17A and 17B show tangible media, respectively a removable non-volatile memory unit and a compact disc (CD) storing computer-readable code which when run by a computer perform operations according to embodiments.
Figure 17B:
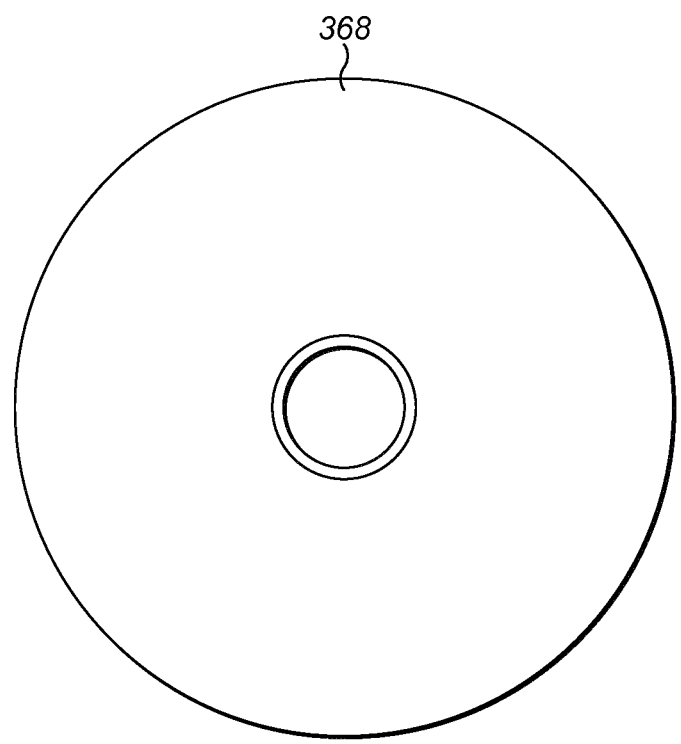

FIGS. 17A and 17B show tangible media, respectively a removable memory unit 365 and a compact disc (CD) 368, storing computer-readable code which when run by a computer may perform methods according to example embodiments described above. The removable memory unit 365 may be a memory stick, e.g. a USB memory stick, having internal memory 366 storing the computer-readable code. The memory 366 may be accessed by a computer system via a connector 367. The CD 368 may be a CD-ROM or a DVD or similar. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

As used in this application, the term "circuitry" refers to all of the following: (a) hardware-only circuit implementations (such as implementations in only analogue and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a server, to perform various functions) and (c) to circuits, such as a microprocessor(s) or a portion of a microprocessor(s), that require software or firmware for operation, even if the software or firmware is not physically present.

If desired, the different functions discussed herein may be performed in a different order and/or concurrently with each other. Furthermore, if desired, one or more of the above-described functions may be optional or may be combined. Similarly, it will also be appreciated that the flow diagrams of FIGS. 2, 4, 6, 9, 11 and 15 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

In the embodiments described above, an imaging device (such as the imaging device 2 shown in FIG. 1) is described as moving along an arc between image capturing start time and an image capturing end time. This is not essential to all forms of the invention. For example, other trajectories are possible, such as a the imaging device being turned (without moving along an arc) or linear movement of the imaging device.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising:
   at least one processor; and
   at least one non-transitory memory including computer program code, the at least one memory and the computer program code configured to, with the at least one processor, cause the apparatus to perform at least the following:
   determining a smooth trajectory period for the apparatus;
   receiving a plurality of visual images from an image capturing start time to an image capturing end time, for use in generating a panorama image;
   receiving audio data relating to said plurality of visual images from an audio capturing start time to an audio capturing end time, for use in generating output audio, wherein at least one of:
   the audio capturing start time is defined with a start of the smooth trajectory period, or
   the audio capturing end time is defined with an end of the smooth trajectory period; and
   presenting the generated panorama image with the generated output audio.

2. The apparatus as claimed in claim 1, further caused to perform defining one or more focus elements within the audio data.

3. The apparatus as claimed in claim 2, wherein said one or more focus elements comprise at least one of:
   one or more time periods; or
   one or more zones.

4. The apparatusas claimed in claim 2, wherein the one or more focus elements are user defined.

5. The apparatus as claimed in claim 2, further caused to perform determining said one or more focus elements.

6. The apparatus as claimed in claim 1, further caused to perform defining at least one of the audio capturing start time or the audio capturing end time.

7. The apparatus as claimed in claim 1, wherein at least one of:
   the image capturing start time or the image capturing end time is user defined; or
   the audio capturing start time or the audio capturing end time is user defined.

8. The apparatus as claimed in claim 1, further caused to perform defining a field-of-view of the audio data, wherein the output audio is generated for presentation with panorama image based, at least partially, on the field-of-view.

9. The apparatus as claimed in claim 8, wherein the field-of-view of the audio data is scaled based on a relative size of a first arc, between the image capturing start time and the image capturing end time, with respect to a second arc, between the audio capturing start time and the audio capturing end time.

10. The apparatus as claimed in claim 1, further caused to perform:
   defining a reference direction of the panorama image; and
   modifying the audio data in a range of directions generally opposite to said reference direction, wherein the audio data in the range of directions generally opposite to said reference direction is modified such that, when presented with the panorama image, said modified audio data appears to originate from a single direction.

11. The apparatus as claimed in claim 1, wherein the generated output audio comprises spatial audio that is spatially presented with respect to the generated panorama image.

12. The apparatus as claimed in claim 1, wherein the image capturing start time is at least partially different from the audio capturing start time, and wherein the image capturing end time is at least partially different from the audio capturing end time.

13. A method comprising:
   determining a smooth trajectory period for visual capture;
   receiving a plurality of visual images from an image capturing start time to an image capturing end time, for use in generating a panorama image;
   receiving audio data relating to said plurality of visual images from an audio capturing start time to an audio capturing end time, for use in generating output audio, wherein at least one of:
      the audio capturing start time is defined with a start of the smooth trajectory period, or
      the audio capturing end time is defined with an end of the smooth trajectory period; and
   presenting the generated panorama image with the generated output audio.

14. The method as claimed in claim 13, further comprising defining one or more focus elements within the audio data.

15. The method as claimed in claim 14, wherein said one or more focus elements comprise at least one of:
   one or more time periods; or
   one or more zones.

16. The method as claimed in claim 14, wherein the one or more focus elements are user defined.

17. The method as claimed in claim 14, further comprising determining said one or more focus elements.

18. The method as claimed in claim 13, further comprising defining at least one of the audio capturing start time or the audio capturing end time.

19. The method as claimed in claim 13, wherein at least one of:
   the image capturing start time or the image capturing end time is user defined; or
   the audio capturing start time or the audio capturing end time is user defined.

20. A non-transitory computer readable medium comprising program instructions stored thereon for performing at least the following:
   determining a smooth trajectory period for visual capture;
   receiving a plurality of visual images from an image capturing start time to an image capturing end time, for use in generating a panorama image;
   receiving audio data relating to said plurality of visual images from an audio capturing start time to an audio capturing end time, for use in generating output audio, wherein at least one of:
      the audio capturing start time is defined with a start of the smooth trajectory period, or
      the audio capturing end time is defined with an end of the smooth trajectory period; and
   presenting the generated panorama image with the generated output audio.

* * * * *